April 8, 1969     E. D. LONG     3,437,188
ELECTRIC SPEED CONTROL SYSTEM FOR A FLUID OPERATED DISC CLUTCH
Filed May 3, 1967     Sheet 1 of 2
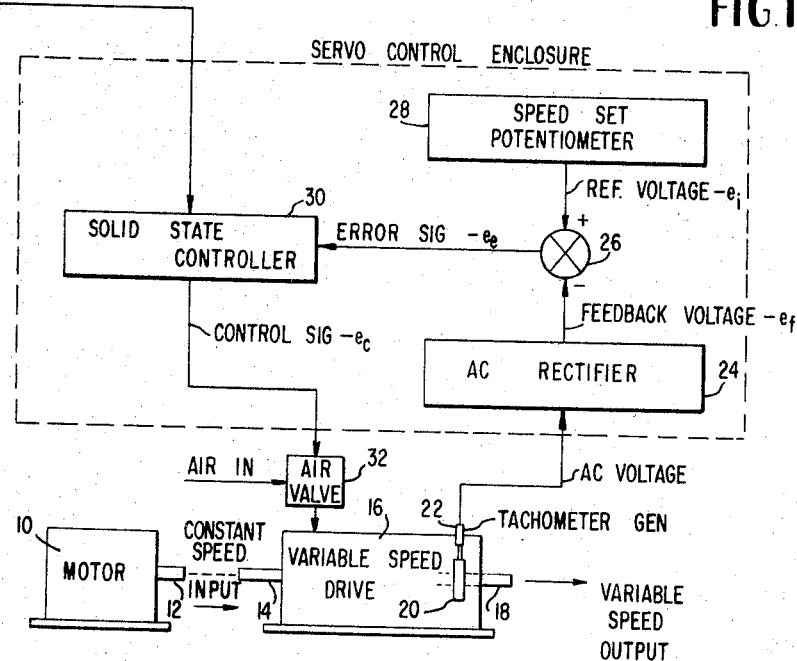
FIG. 1
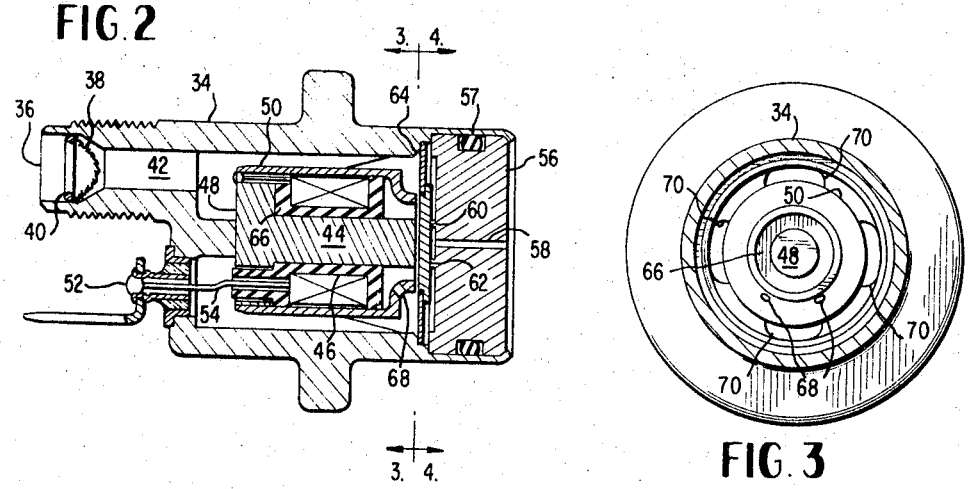
FIG. 2
FIG. 3
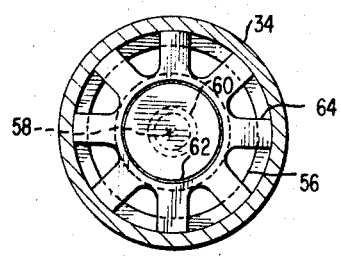
FIG. 4
INVENTOR
E. David Long
BY Brady, O'Boyle & Gates
ATTORNEY United States Patent Office 3,437,188
Patented Apr. 8, 1969

3,437,188
ELECTRIC SPEED CONTROL SYSTEM FOR A FLUID OPERATED DISC CLUTCH
Emile David Long, Elmira, N.Y., assignor, by mesne assignments, to Gillett Tool Co., Inc., Buffalo, N.Y.
Filed May 3, 1967, Ser. No. 635,906
Int. Cl. F16d 23/10, 43/06, 43/24
U.S. Cl. 192—103        9 Claims

ABSTRACT OF THE DISCLOSURE

A closed loop servo speed control system for motors having a variable speed drive coupled to its output shaft wherein the drive is controlled by an extremely fast-acting air valve which is responsive to a control signal generated in accordance with the desired speed of the drive output as compared with the actual speed of the drive. The actuation of the air valve frequency modulates air flow into the drive for varying the amount of clamping pressure applied to a disc stack thereby varying the amount of torque transmitted to the output shaft.

Background of the invention

This invention pertains to variable speed drives where a controlled variable output speed is desired from a constant speed input. It is well known to those skilled in the art to employ closed looped control servo loops having tachometric feedback means coupled to the output of the drive for obtaining regulation of the desired output speed. Such systems respond to an error signal which is generated when a comparison is made between the desired output speed and the speed as indicated from the feedback transducer. A control signal is generated from the error signal to alter the output of the drive until the error signal is reduced to zero. Where variable speed drives operating on the principle of controlled slippage are utilized, control of the output speed within a tolerance of 1% or better of the desired speed has heretofore been extremely difficult if not impossible to obtain over the full speed range of the system.

Devices are well known which obtain a variable speed output by modulation of the torque on a disc stack contained in the drive. The disc stack, for example, may be composed of alternate steel discs and sintered bronze discs on a high carbon steel core. A continuous positive supply of oil is pumped through the disc stack by a centrifugal pump that is integral with the input shaft of the drive. Pockets and lands are included on the sintered bronze discs and behave in a manner analogous to hydrodynamic step bearing in maintaining a positive but thin oil film between the discs. Torque is transmitted from the input to the output shaft by a viscous shear of this oil film maintained by the thousands of small hydrodynamic step bearings. The amount of torque transmitted is a function of the clamping pressure on the disc stack. This clamping pressure is supplied by an air piston that is built into the output shaft.

Summary of the invention

The present invention is directed to control means for a clutch type variable speed drive for a constant speed motor input comprising a closed loop control circuit for the drive including air valve means coupled to said drive for varying the amount of clamping pressure supplied to the drive for controlling the output speed thereof, said air valve being responsive to a control signal generated in a solid state controller circuit comprised of a dual differential amplifier circuit which is responsive to a speed error signal which is derived from a summing network having two inputs comprising a voltage proportional to the desired speed and a feedback voltage proportional to the actual output speed of the drive as sensed by a tachometer generator coupled to the output shaft of the drive. The electrically operated air valve exhibits a relatively high speed response so that extremely high actuation speeds are provided. Additionally, the summing network is selectively chosen such that the error signal fed to the solid state controller contains an AC ripple signal having a frequency equal to the output speed of the control shaft. The air valve responds to the ripple signal to frequency modulate the air flow into the variable speed drive controlling the output speed thereof. The subject invention then discloses a servo loop for an extremely fast acting air valve which responds to the AC level on the error signal to vary the output speed of the drive.

Brief description of the drawings

FIGURE 1 is a block diagram of the motor speed controller system comprising the subject invention;
FIGURE 2 is a central longitudinal cross-sectional view of an air valve adapted to be utilized in the subject invention;
FIGURE 3 is a transverse cross-sectional view taken along the lines 3—3 of FIGURE 2;
FIGURE 4 is a transverse cross-sectional view taken along the lines 4—4 of FIGURE 2.

Description of the preferred embodiments

Figure 5:
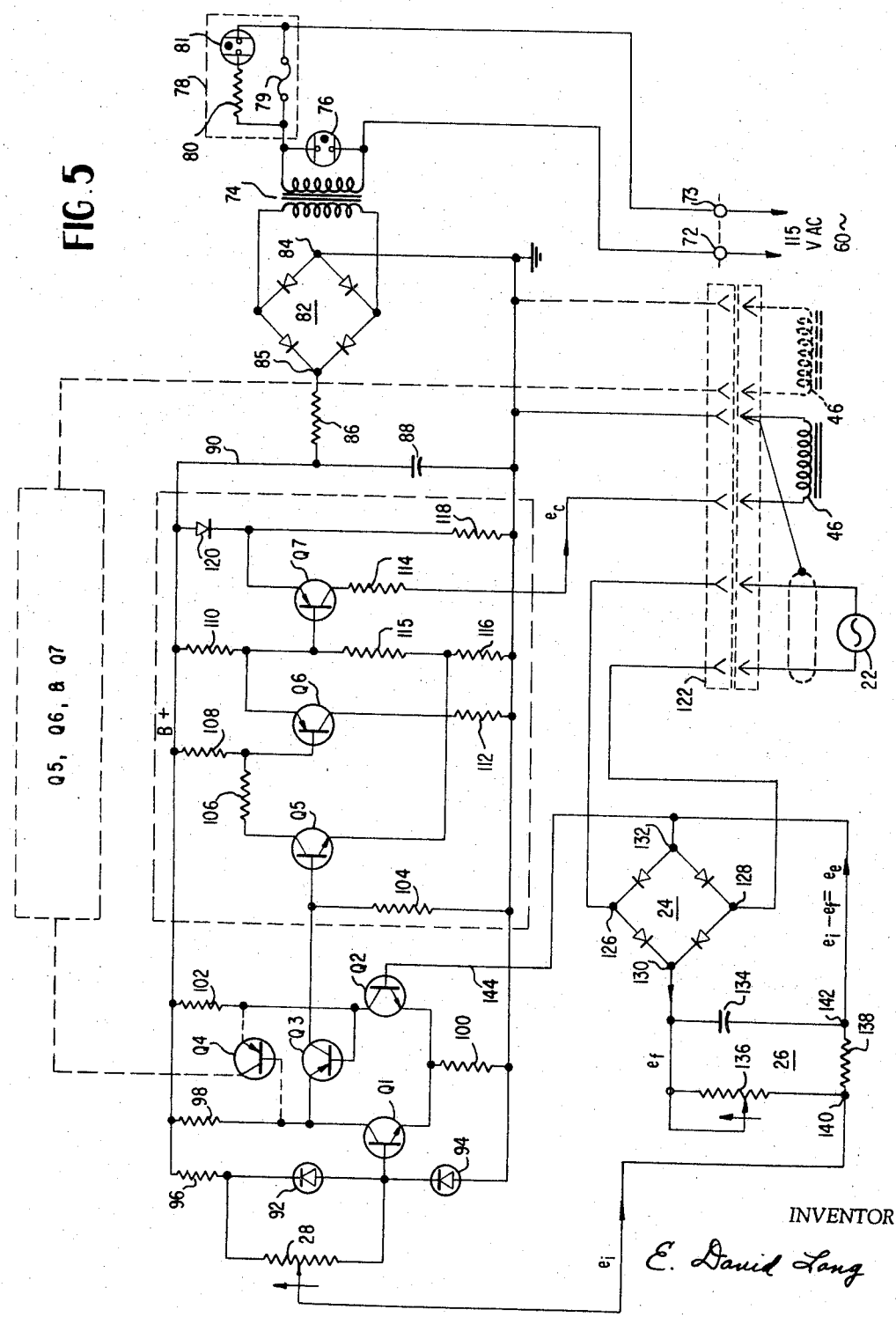
FIGURE 5 is a schematic electrical diagram of the electrical circuitry comprising a portion of the subject invention.

Directing attention now to FIGURE 1, a block diagram of the subject invention is disclosed for controlling a variable speed drive as described above. Reference numeral 10 designates a constant speed motor having its output shaft 12 connected to the input shaft 14 of a variable speed drive 16. The variable speed drive 16 is of the type described above wherein the output torque is a function of the clamping pressure applied to a disc stack, not shown, by means of an air piston, not shown, that is built into the output shaft 18. The output shaft 18 has a gear 20 mechanically coupled to it and is adapted to operate in combination with the tachometer generator 22 for providing an AC output voltage which is directly proportional to the output speed of the shaft 18. The gear 20 may be for example a pulse gear and the tachometer generator 22 may comprise a proximity pickup which is responsive to the gear teeth movement of the pulse gear. The AC voltage comprising the output of the tachometer generator 22 not only has an amplitude which is proportional to the output speed but the frequency of the AC voltage varies as well. An AC rectifier means 24 is coupled to the tachometer generator 22 and provides a feedback voltage $e_f$ which is fed into a summing network 26 to which is applied a reference voltage $e_i$ from a speed set potentiometer 28. The output of the summing network 26 is an error signal $e_e$ which is the difference between the voltages $e_i$ and $e_f$. The speed error signal $e_e$ is then applied to a solid state controller circuit 30 which produces an output of a control signal $e_c$. The control signal is applied to a high speed air valve 32 which is mechanically coupled to an air piston, not shown, in the variable speed drive 16. The control signal $e_c$ controls the action of the air valve 32 so that the clamping pressure applied to the air piston is varied in a manner to control the output speed of the shaft 18.

FIGURE 2 is a central longitudinal cross-sectional view of an air valve 32 having the high speed response necessary for controlling the variable speed drive 16. A similar type of valve is disclosed in U.S. Patent 2,881,980 issued to D. A. Beck et al. This patent, however, is directed to a high speed fuel injection nozzle for supplying fuel in measured amounts to cylinders of internal combustion engines. The distinguishing characteristic of such a valve is that it is accurately controllable while having a quick response time.

Considering now FIGURE 2, the air valve contemplated for use in combination with the subject invention comprises a housing 34 having an air intake port 36 located at one end. An air filter 38 is located in the input port 36 and secured to the inner surface thereof by a retaining ring 40. An air passage 42 conducts air supplied to the intake port 36 through the filter 38 and into the inner chamber of the housing 34. An electrical solenoid generally referred to by reference numeral 44 is located on the inside of the housing 34 and is comprised of an electrical coil 46, an inner pole piece 48 and an outer pole piece 50. The solenoid 44 is coupled to an electrical connector 52 located on the housing 34 by means of a circuit lead 54. The housing 34 provides the ground return for the solenoid 44. At the opposite end of the housing 34 is located an orifice member 56 having a single elongated air passage 58 located at the center thereof. The inner surface of the orifice member 56 contains a raised circular valve seat 60 upon which a circular flapper valve 62 is held in spring-biased contact therewith by means of a star spring 64.

FIGURE 3 is a transverse cross-sectional view of the air valve taken at lines 3—3 and illustrates the coaxial relationship of the members such as the inner pole piece 48, the outer pole piece 50 and the housing 34. Additionally, the insulation 66 for the coil winding 46 is shown located between the inner and outer pole pieces 48 and 50. Two small holes 68 are located in the lower portion of the outer pole piece 50 for providing pneumatic pressure relief for the valve. Four openings 70 are shown in FIGURE 3 and allow air to pass from the air passage 42 into the space surrounding the solenoid 44 and into the vicinity of the flapper valve 62.

FIGURE 4 discloses a transverse cross-sectional view of the air valve taken along lines 4—4 and highlights the configuration of the star spring 64 in combination with the flapper valve 62. The orifice member 56 and its circular raised valve seat 60 is shown disclosed beneath the flapper valve 62 as well as the relatively small diameter of elongated exit passage 58.

The housing 34 of the air valve 32 is secured to the variable speed drive 16 so that the end of the air valve containing the orifice member 56 and elongated air passage 58 is directly coupled to an air piston, not shown, in the drive 16 that is built into the output shaft 18. The intake port 36 is connected to an air supply source, not shown, which is adapted to supply air under a predetermined pressure to the chamber 42. When operated, the air valve 32 delivers air under pressure to the air piston which controls the amount of clamping pressure applied to the disc stack.

When the electrical solenoid 44 is energized by means of applying an electrical signal to the connector 52, the flapper valve 62 is pulled against the outer pole piece 50 whereupon pressurized air is allowed to pass beneath the flapper valve 62 over the raised circular valve seat 60 and into the exit passage 58. When the energizing potential is removed from the solenoid 44, the flapper valve 62 will again seat itself against the valve seat 60 due to the biasing action of the star spring 64. Because of the relatively short distance that the flapper valve 62 moves between the outer pole piece 50 and the raised portion 60 of the orifice 56, extremely high actuation speeds in the order of a thousand times a second are provided.

With reference to FIGURE 5 there is disclosed a schematic electrical diagram of what is considered to be the preferred embodiment of the servo control circuitry for actuating the air valve 32 in response to the desired output speed and the feedback signal obtained from the tachometer generator 22. More particularly, a pair of terminals 72 and 73 are adapted to be connected to a source of 60 cycle, 115 volt AC power. Terminals 72 and 73 are coupled across a primary winding of a power transformer 74 across which is connected an indicator light 76. Connected in series between terminal 73 and one end of the primary winding is a burn-out indicator fuse holder 78 comprising a power fuse 79, a resistor 80 and an indicator light 81 coupled in series across the fuse 79 for indicating an open circuit condition. The secondary winding of the power transformer 74 is coupled to a full wave bridge rectifier circuit 82 comprised of four diode rectifiers which may be for example semiconductor diodes. Terminal 84 of the bridge rectifier 82 is returned to a point of common potential illustrated and referred to hereafter as ground. Terminal 85 is coupled to a resistor 86 and capacitor 88 is a filtered DC supply voltage of a predetermined amplitude suitable for powering semi-conductor devices such as transistors. Thus a B+ supply potential is available on the supply bus 90.

Two Zener diodes 92 and 94 are connected in series from ground to the B+ potential through a series resistor 96. Zener diodes are well known devices which are characterized by their voltage clamping action when back biased by a predetermined voltage. A speed set potentiometer 28 is coupled directly across the Zener diode 92. A first reference voltage is thus established across Zener diode 92. The wiper arm of the potentiometer 28 is manually variable so that a voltage $e_i$ indicative of a desired output speed may be selected.

The voltage across Zener diode 94 establishes a second reference voltage level for the transistor Q1. The base of transistor Q1 is connected to the common connection between Zener diodes 92 and 94 and the collector load resistor 98 is connected to the B+ bus 90. The emitter of transistor Q1 is directly connected to the emitter of transistor Q2. Both emitters are returned to ground through resistor 100. A third transistor Q3 has its base connected to the collector of transistor Q2 and its emitter to the collector of transistor Q1. A collector load resistor 102 couples the B+ potential to the collector of Q2. When desirable, a fourth transistor Q4 may be coupled in parallel to transistor Q3 but in a reverse direction. More specifically when transistor Q4 is utilized the base of transistor Q4 is directly connected to the collector of Q1 while the emitter is connected to the collector of Q2.

Transistor Q3 is coupled to a driver circuit 103 comprising transistors Q5, Q6 and Q7 such that the collector is connected to the base of transistor Q5. Resistor 104 is coupled from the base of transistor Q5 to ground acting as the necessary collector load resistor for transistor Q3 and the bias resistor for transistor Q5. The collector of transistor Q5 is coupled to the base of transistor Q6 by means of resistors 106 and 108. Resistors 110 and 112 are connected to the emitter and collector, respectively, of transistor Q6. The emitter of Q6 is directly connected to the base of transistor Q7, the collector of which is coupled to the solenoid coil 46 of an air valve 32 such as shown in FIGURE 2.

When the fourth transistor Q4 is utilized, its collector is coupled into another driver circuit comprising transistors Q5, Q6 and Q7 with the output being coupled to a second coil 46 for another air valve 32, not shown. The output of transistor Q3 is used to control the output speed of the variable speed drive; however, transistor Q4 when utilized is used for braking purposes.

The tachometer generator 22 as well as one or more solenoid coils 46 are coupled into the circuitry shown in FIGURE 5 through a terminal board or other suitable connector 122. The tachometer generator 22 is coupled into a full wave bridge rectifier 124 comprising four diode rectifiers at terminals 126 and 128. The opposite terminals 130 and 132 comprise the output terminals of the bridge 124. Output terminal 130 is directly connected to the capacitor 134 and a rheostat 136. The opposite end of capacitor 134 is connected to one end of resistor 138 at terminal 142 while the opposite end of resistor rheostat 136 is connected to the other end of resistor 138 at terminal 140. A circuit lead 144 common to terminals 132 and 142 is coupled to the base of transistor Q2. Also the wiper of potentiometer is directly connected to terminal 140.

In operation the speed set potentiometer 28 is varied to select a desired output speed providing a predetermined command voltage of $e_i$ which is applied to terminal 140. The voltage produced by the tachometer generator 122 which is indicative of the actual output speed of the shaft 18 of the variable speed drive 16 is applied to the full wave rectifier bridge which converts the AC voltage from the tachometer generator 22 to a substantially DC voltage; however, since the rectifiers forming the full wave rectifier bridge 124 are not perfect devices, a certain amount of AC ripple voltage exists at terminal 130. The feedback voltage $e_f$ then comprises a DC voltage plus a small AC component. Capacitor 134 charges to the peak value of the AC during each half cycle of the input to the bridge rectifier. Resistances 136 and 138 form a summing network 26 so that a difference voltage or error signal $e_e$ is provided at terminal 142 and is applied to the base of transistor Q2 by means of lead 144. As indicated above, the error signal $e_e$ comprises both a DC and an AC component. The value of capacitor 134 is chosen such that the ripple component is retained on the error signal $e_e$.

Transistors Q1, Q2 and Q3 comprise a double differential circuit configuration with the error signal $e_e$ being applied to the base of transistor Q2 while the second reference voltage established by the Zener diode 94 is applied to the base of transistor Q1. The base of transistor Q1 is always at a fixed potential established by the Zener diode 94. This potential is also equal to the minimum speed voltage with the wiper of potentiometer 28 at the extreme zero speed set position. Transistors Q1 and Q2 operate to constantly examine the difference between the second reference voltage at the base of transistor Q1 and the error signal $e_e$ at the base of Q2. The third transistor Q3 acts as a second differential circuit, the output of which is comprised primarily of the AC component of the error signal. This signal is fed to the transistor Q5 where it receives a stage of amplification and then to transistor Q6 which acts as an emitter follower for coupling to the second stage of amplification as provided by transistor Q7. The output signal $e_c$ from the transistor Q7 is a control signal which is then applied to the solenoid coil 46. Inasmuch as the control $e_c$ is primarily an AC signal, the air valve 32, not shown, is driven at a frequency corresponding to the output of the tachometer generator 22. The frequency of the AC control signal $e_c$ frequency in effect modulates air flow by providing a rapidly changing or pulsation stream of air into the air piston which in turn controls the clamping pressure applied to the disc stack in the variable speed drive 16. For example, a constant pressure of 60 p.s.i. may be applied to the valve 32; however, depending upon the frequency of operation in accordance with the signal $e_c$, the clamping pressure will vary between 3–45 p.s.i. Furthermore, the action is in a direction to cause the output shaft 18 to either speed up or slow down until such time as the reference voltage $e_i$ and $e_f$ cancel each other resulting in a zero error signal.

The present invention therefore provides a means whereby a variable speed drive is controlled by means of a high speed actuation air valve controlled from an electrical signal generated in a closed loop servo system.

While there has been shown and described what is at the present considered to be a preferred embodiment of the invention, modifications will readily occur to those skilled in the art. It is not desired therefore that the invention be limited to the specific arrangement shown and described but it is to be understood that all equivalents, alterations and modifications within the spirit and scope of the present invention are herein meant to be included.

I claim:

1. A speed control servo system for a variable speed drive operated by means of the clamping pressure applied by means of an air piston operably connected to a disc stack coupling the input and output shafts thereof, comprising in combination:
    an air supply source;
    an electrically operated air valve coupled between said air supply source and said variable speed drive, being responsive to a control signal, being rendered operative thereby to vary the air pressure on said air piston which then controls the clamping pressure applied to said disc stack;
    tachometer means coupled to said output shaft and providing an electrical feed back signal proportional to the rotational output speed thereof;
    first circuit means for providing a predetermined command signal indicative of the desired rotational output speed of said output shaft;
    comparator circuit means coupled to said tachometer means and said first circuit means for providing an error signal of the difference between said predetermined command signal and said feedback signal; and
    controller circuit means coupled between said comparator circuit means and said air valve, being responsive to said error signal for generating said control signal which is applied to said air valve, said controller circuit means comprising a dual differential amplifier circuit having a first and a second input means, a source of supply voltage coupled to said dual differential amplifier circuit, second reference voltage means coupled to said supply voltage for providing a second reference voltage, circuit means for applying said second reference voltage to said first input means and circuit means for coupling said error signal to said second input means.

2. The servo system as defined in claim 1 wherein said electrically controlled air valve comprises a high speed actuation valve comprising a housing, an air intake port located in one end of said housing, an electrical solenoid mounted internally of said housing being adapted to allow intake air to pass through said housing, an orifice member having a valve seat and an exit port located at the other end of said housing, a spring biased flapper valve located between said electrical solenoid and said orifice member being biased against said valve seat to prevent the passage of intake air into said exit port in absence of solenoid energization and being adapted to move into contact with said solenoid upon energization thereof for allowing air to pass to said exit port and means coupling said exit port to said air piston.

3. The servo system as defined in claim 1 wherein said tachometer means comprises: a pulse gear coupled to said output shaft, and a proximity pickup responsive to rotation of said gear to generate said feedback signal which is proportional to the output speed of said output shaft.

4. The servo system as defined by claim 1 wherein said first circuit means comprises a source of supply voltage, Zener diode means coupled to said supply voltage for providing a first reference voltage thereacross, and potentiometer circuit means coupled across said Zener diode means having a manually adjustable wiper arm for providing a command signal indicative of the desired rotational output speed of said output shaft.

5. The invention as defined by claim 1 and additionally including an AC rectifier means coupled between said tachometer means and said comparator circuit means, and whereby said comparator circuit means comprises a resistive summing network coupled to said rectifier means and said first circuit means.

6. The invention as defined by claim 1 and additionally including driver amplifier means coupled to the double differential circuit generating said control signal for actuating said air valve.

7. The invention as defined by claim 1 wherein said double differential circuit comprises a first, a second and a third transistor each having a base, a collector and an emitter, a first resistor commonly coupled to the emitter of said first and said second transistor, circuit means coupling said second reference potential to the base of said first transistor, circuit means coupling the error signal to the base of said second transistor, first and second collector load resistors respectively coupling the collector of said first and said second transistor to said source of supply voltage, circuit means for coupling the base of said third transistor to the collector of said second transistor and the emitter of said third transistor to the collector of said first transistor, and output means coupled to the collector of said third transistor.

8. The invention as defined by claim 7 and additionally including a fourth transistor having a base, a collector and an emitter, circuit means for connecting the base of said fourth transistor to the collector of said first transistor, and the emitter to the collector of said second transistor, and second output means coupled to the collector of said fourth transistor.

9. The invention as defined by claim 1 wherein said controller circuit means is comprised of a solid state controller circuit.

References Cited
UNITED STATES PATENTS

| | | | |
|---|---|---|---|
| 2,642,972 | 6/1953 | Brooks. | |
| 2,788,104 | 4/1957 | Mason | 192—18.2 X |
| 2,816,635 | 12/1957 | Danley et al. | 192—12.2 |
| 3,232,399 | 1/1966 | Harned et al. | 192—103 |

BENJAMIN W. WYCHE III, *Primary Examiner.*

U.S. Cl. X.R.

192—70.14, 104; 310—95